United States Patent
Yin et al.

(10) Patent No.: US 9,055,314 B2
(45) Date of Patent: Jun. 9, 2015

(54) SECURE TRANSFER OF CREDIT CARD INFORMATION

(71) Applicant: Verizon Patent and Licensing Inc., Basking Ridge, NJ (US)

(72) Inventors: Fenglin Yin, Lexington, MA (US); Jack Jianxiu Hao, Lexington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 105 days.

(21) Appl. No.: 13/644,684

(22) Filed: Oct. 4, 2012

(65) Prior Publication Data

US 2014/0101679 A1    Apr. 10, 2014

(51) Int. Cl.

| | |
|---|---|
| *G06F 21/00* | (2013.01) |
| *H04N 7/16* | (2011.01) |
| *H04L 9/32* | (2006.01) |
| *H04N 21/2543* | (2011.01) |
| *H04N 21/4623* | (2011.01) |
| *H04N 21/6334* | (2011.01) |
| *H04L 29/06* | (2006.01) |
| *G06F 21/10* | (2013.01) |

(52) U.S. Cl.
CPC ....... *H04N 21/2543* (2013.01); *H04N 21/4623* (2013.01); *H04N 21/6334* (2013.01); *H04L 2209/603* (2013.01); *H04L 63/0807* (2013.01); *G06F 21/10* (2013.01)

(58) Field of Classification Search
USPC ................. 709/223; 726/9; 713/182
See application file for complete search history.

(56) References Cited

U.S. PATENT DOCUMENTS

| 8,353,016 B1* | 1/2013 | Pravetz et al. ..................... 726/5 |
|---|---|---|
| 2002/0067733 A1* | 6/2002 | Stoeckl et al. ................ 370/401 |
| 2005/0044197 A1* | 2/2005 | Lai ................. 709/223 |
| 2006/0075134 A1* | 4/2006 | Aalto et al. ................... 709/238 |
| 2007/0097860 A1* | 5/2007 | Rys et al. ..................... 370/229 |
| 2007/0143835 A1* | 6/2007 | Cameron et al. ................... 726/9 |
| 2008/0263600 A1* | 10/2008 | Olague et al. .................. 725/58 |
| 2009/0034546 A1* | 2/2009 | Nagata .......................... 370/401 |
| 2009/0300747 A1* | 12/2009 | Ahn ................................ 726/9 |
| 2010/0198730 A1* | 8/2010 | Ahmed et al. ................. 705/50 |
| 2011/0138064 A1* | 6/2011 | Rieger et al. ................. 709/228 |
| 2011/0176747 A1* | 7/2011 | Dumitru et al. .............. 382/305 |
| 2011/0246567 A1* | 10/2011 | Cedervall et al. ............. 709/203 |
| 2011/0247076 A1* | 10/2011 | Chen et al. ..................... 726/26 |
| 2012/0059761 A1* | 3/2012 | Gillin et al. ................. 705/39 |
| 2012/0102553 A1* | 4/2012 | Hsueh et al. ..................... 726/6 |
| 2012/0216268 A1* | 8/2012 | Kassaei et al. ................... 726/9 |

* cited by examiner

*Primary Examiner* — Nasser Goodarzi
*Assistant Examiner* — Tariq Gbond

(57) ABSTRACT

A method includes receiving, at a video service provider system, a security markup assertion language (SAML) token encrypted for a partner federated security token service (FSTS) device from a client device. The method includes submitting the SAML token to the partner FSTS device in exchange for a partner SAML token. The partner SAML token is encrypted for a partner account device. The method also includes receiving the partner SAML token, and sending the partner SAML token to the client device. The client device is configured to request an access token from the partner account device based on the partner SAML token and to submit an encrypted message including credit card information to the partner account device based on the access token.

20 Claims, 9 Drawing Sheets

SECURE TRANSFER OF CREDIT CARD INFORMATION

BACKGROUND

Video service providers currently provide multiple services and programs, including cable television, network television, and video on demand, to their customers. In some instances, individual customers may receive combinations of these multiple services from a single video service provider.

Video service providers may protect video services using security assertion markup language (SAML), which is a standard for exchanging authentication and authorization information between an identity provider, such as a security token service, and a service provider. Security token services are known to transfer security information in SAML assertions. SAML assertions may contain statements (including authentication statements, attribute statements, and authorization decision statements) that allow the service providers to make determinations with regard to a requesting party.

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Systems and/or methods described herein may provide encryption of credit card information using a public key of a partner credit card database server (PCCDB). The systems may enable client authentication and secure delivery (i.e., transfer from a customer to the PCCDB) of credit card information in an online video platform. The received message may only be decrypted by the PCCDB, thereby providing end to end security.

Figure 1:
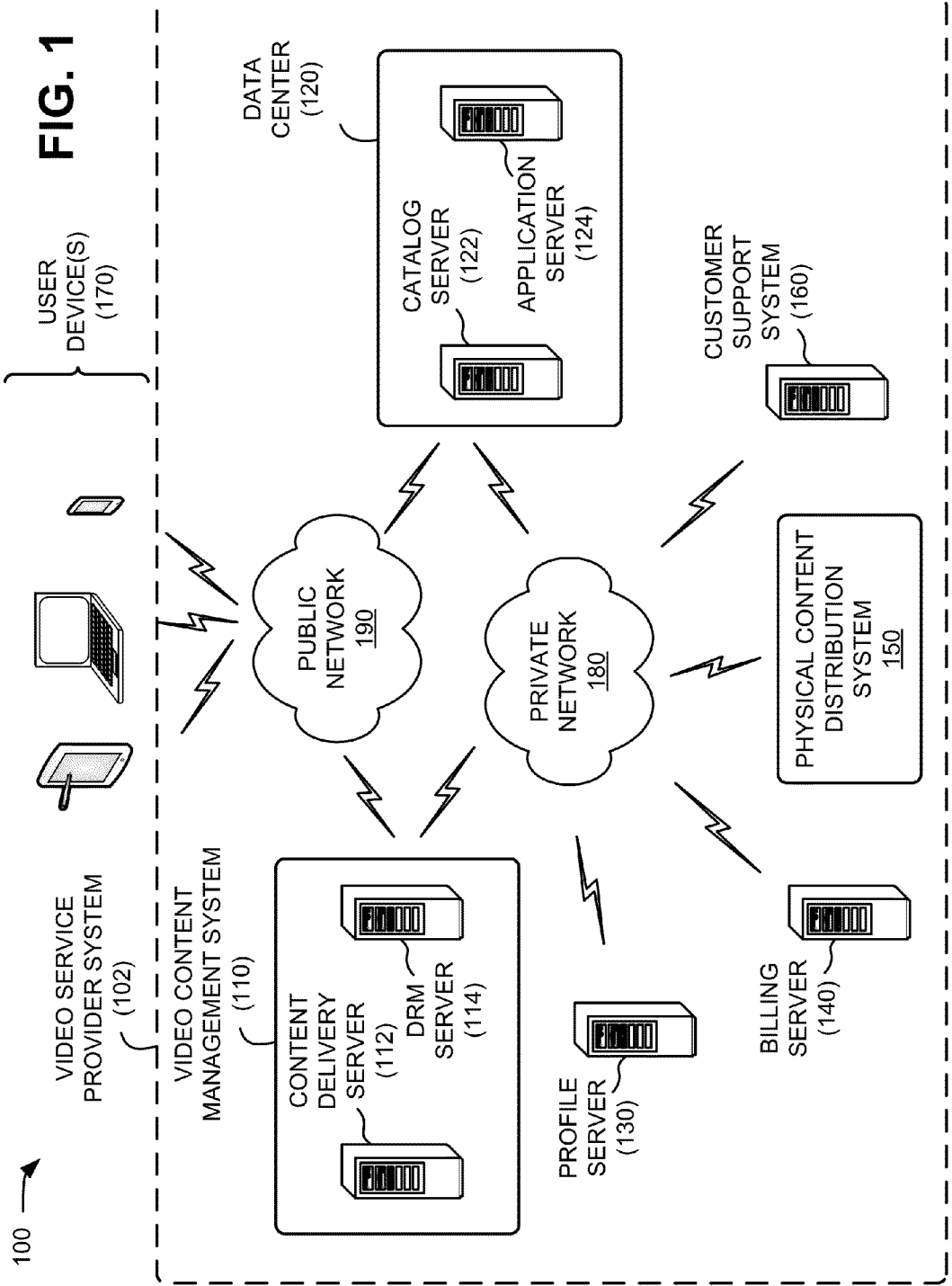
FIG. 1 is an exemplary network in which systems and/or methods described herein may be implemented.

FIG. 1 is an exemplary network 100 in which systems and/or methods described herein may be implemented. As illustrated, network 100 may include a video service provider system 102 and user devices 170, which may receive an online video service from video service provider system 102.

Video service provider system 102 may include video content management system (VCMS) 110, a data center 120, a profile server 130, a billing server 140, a physical content distribution system 150, a customer support system 160, a private network 180, and a public network 190. The particular arrangement and number of components of network 100 shown in FIG. 1 are illustrated for simplicity. In practice there may be more VCMSs 110, data centers 120, profile servers 130, billing servers 140, physical content distribution systems 150, customer support systems 160, user devices 170, and/or networks 180/190. Components of network 100 may be connected via wired and/or wireless links.

User devices 170 may enable a user to receive video content (i.e., an online video session) from video service provider system 102. User devices 170 may include, for example, a gaming console, a personal communications system (PCS) terminal (e.g., a smartphone that may combine a cellular radiotelephone with data processing and data communications capabilities), a tablet computer, a personal computer, a laptop computer, an Internet television, or other types of computation or communication devices.

Video service provider system 102 may be part of a core network that provides online video service. Video service provider system 102 may be affiliated with a service provider entity (e.g., a commercial video service provider). Video service provider system 102 may provide multiscreen support for the online video service (e.g., for Internet protocol (IP) based video content) to user devices 170 in association with a partner entity (i.e., a digital service reseller that acts as a partner of the video service provider entity).

VCMS 110 may aggregate content, process content, and distribute content. In one implementation, VCMS 110 may include a content delivery server 112 and a digital rights management (DRM) server 114. VCMS 110 may aggregate content and transcode content into a digital format suitable for consumption on particular user devices 170. For example, VCMS 110 may include a transcoding device to convert an audio, video, multimedia or graphic file from one format to another (e.g., from one bit rate to another bit rate, from one resolution to another, from one standard to another, from one file size to another, etc.). VCMS 110 may also encrypt data and communicate with user devices 170 through DRM server 114 to enforce digital rights.

Content delivery server 112 may deliver digital content from a backend server to user devices 170. In one implementation, content delivery server 112 may include a streaming server that provides streaming data packets (e.g., via a streaming uniform resource locator (URL)) to user devices 170 (e.g., via public network 190). In one implementation, a streaming URL may be session-based, such that each URL can be used only once for one user device 170 for security purposes.

DRM server 114 may issue, validate, and/or enforce DRM licenses to a mobile client, such as an application running on one of user devices 170. In implementations herein, DRM server 114 may communicate with user device 170 to validate an authorization token in issuing a license for an application residing on user device 170.

Data center 120 may manage the authorization, selection, and/or purchase of multimedia content by a user of user device 170 (i.e., based on input associated with the user received from user device 170). As shown in FIG. 1, data center 120 may include a catalog server 122 and an application server 124. In one implementation, data center 120 may be accessed by user devices 170 via public network 190.

Catalog server 122 may provide a catalog of content for users (e.g., of user devices 170) to order/consume (e.g., buy, rent, or subscribe). In one implementation, catalog server 122 may collect and/or present listings of content available to user devices 170. For example, catalog server 122 may receive digital content metadata, such as lists or categories of content, from VCMS 110. Catalog server 122 may use the content metadata to provide currently available content options to user devices 170. Catalog server 122 may provide the content metadata to user device 170 directly or may communicate with user device 170 via application server 124.

Figure 8:
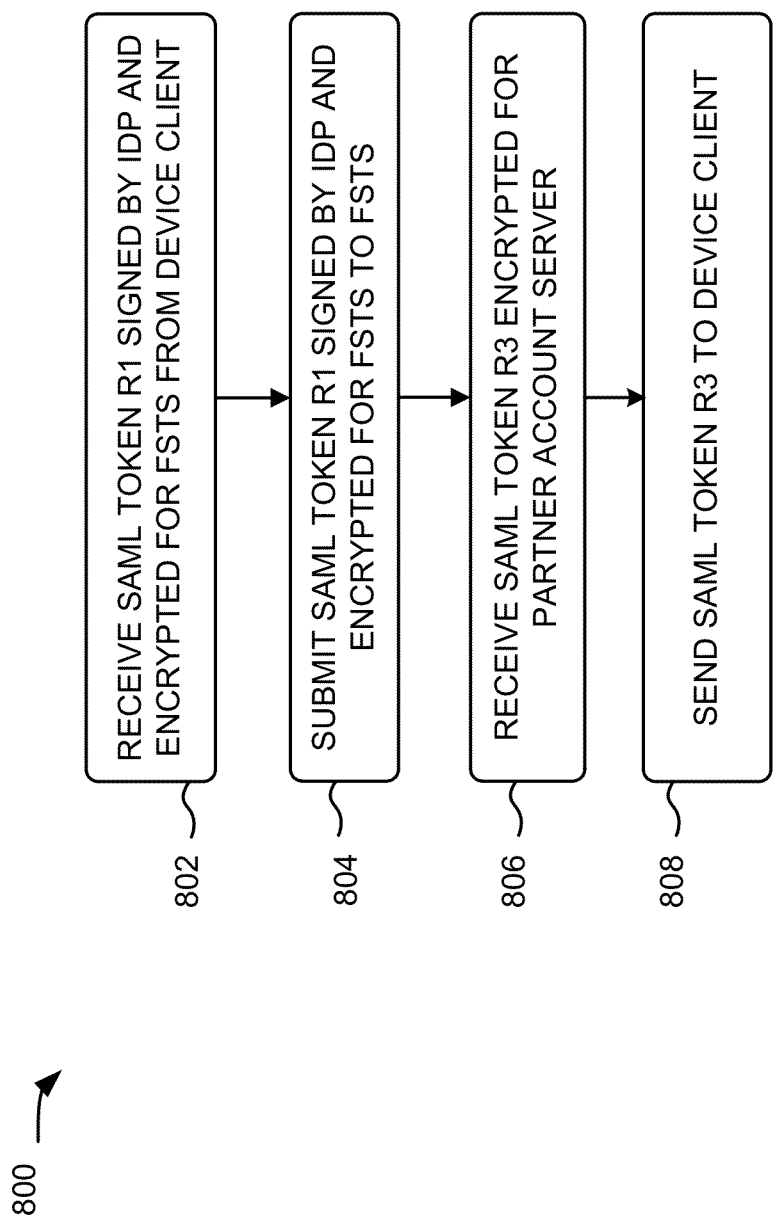
FIG. 8 is a flow chart of an exemplary process for client authentication and secure delivery of credit card information in the online video platform according to an implementation described herein.

Application server 124 may provide a backend support system for mobile applications residing on user devices 170. For example, application server 124 may permit user device 170 to download an application that enables a user to find content of interest or play downloaded or streaming content. Application server 124 may provide digital content in association with VCMS 110. In one implementation, the interactions between application server 124 and user device 170 may be performed using hypertext transfer protocol (HTTP) or secure HTTP (HTTPS) via public network 190. In one implementation, all HTTP transport may be over secure sockets layer (SSL) or transport layer security (TLS). Application server 124 may provide authentication of user devices 170 and secure delivery of credit card information, as described below with respect to signal flow 600 (FIG. 6), and process 800 (FIG. 8).

Profile server 130 may store user profile information for users (e.g., users of user devices 170). The user profile information may include various information regarding a user, such as login information (e.g., a user identifier and a password), billing information, address information, types of services to which the user has subscribed, a list of content purchased by the user, a list of video content rented by the user, a list of video content to which the user has subscribed, a user device identifier (e.g., a media player identifier, a mobile device identifier, a set top box identifier, a personal computer identifier) for user device 170, a video application identifier associated with the video application obtained from application server 124, or the like. Application server 124 may use the user profile information from profile server 130 to authenticate a user and may update the user profile information based on the user's activity (e.g., with a user's express permission).

Billing server 140 may manage charging users for services provided via video service provider system 102. Billing server 140 may include, for example, a payment processing component, a billing component, and/or a settlement component. In some implementations, billing services may be performed by servers external to video service provider system 102 (e.g., billing servers for a partner entity).

Physical content distribution system 150 may track availability of physical content (e.g., DVDs, Blu-ray discs, memory cards, etc.) and provide metadata relating to the physical content for inclusion in catalog information provided to users of user devices 170. In one implementation, physical content distribution system 150 may also provide physical content information, such as location information, so that when a user wants to buy physical content, the system may direct the user to the nearest location for purchasing the physical content. Additionally, or alternatively, physical content distribution system 150 may generate or receive credit information for users (e.g., for cross-promotion purposes with a partner entity). For example, after a user of user device 170 has purchased digital content or a subscription/rental of digital content, the user may be entitled to credits for obtaining a corresponding physical asset or vice versa.

Customer support system 160 may solicit and/or receive user feedback, questions, or credit-related requests.

Private network 180 may include, for example, one or more private IP networks that use a private IP address space. Private network 180 may include a local area network (LAN), an intranet, a private wide area network (WAN), etc. In one implementation, private network 180 may implement one or more Virtual Private Networks (VPNs) for providing communication between, for example, any of VCMS 110, data center 120, profile server 130, billing server 140, physical content distribution system 150, and/or customer support system 160. Private network 180 may be protected/separated from other networks, such as public network 190, by a firewall. Although shown as a single element in FIG. 1, private network 180 may include a number of separate networks.

Public network 190 may include a LAN, a WAN, such as a cellular network, a satellite network, a fiber optic network, a private WAN, or a combination of the Internet and a private WAN, etc., that is used to transport data. Although shown as a single element in FIG. 1, public network 190 may include a number of separate networks that function to provide services to user devices 170.

In implementations described herein, client authentication and secure delivery of credit card information may be provided to support billing of a recipient of video services from a provider network. The client authentication and secure delivery may be provided in an environment that includes a service provider entity and a partner entity.

Figure 2:
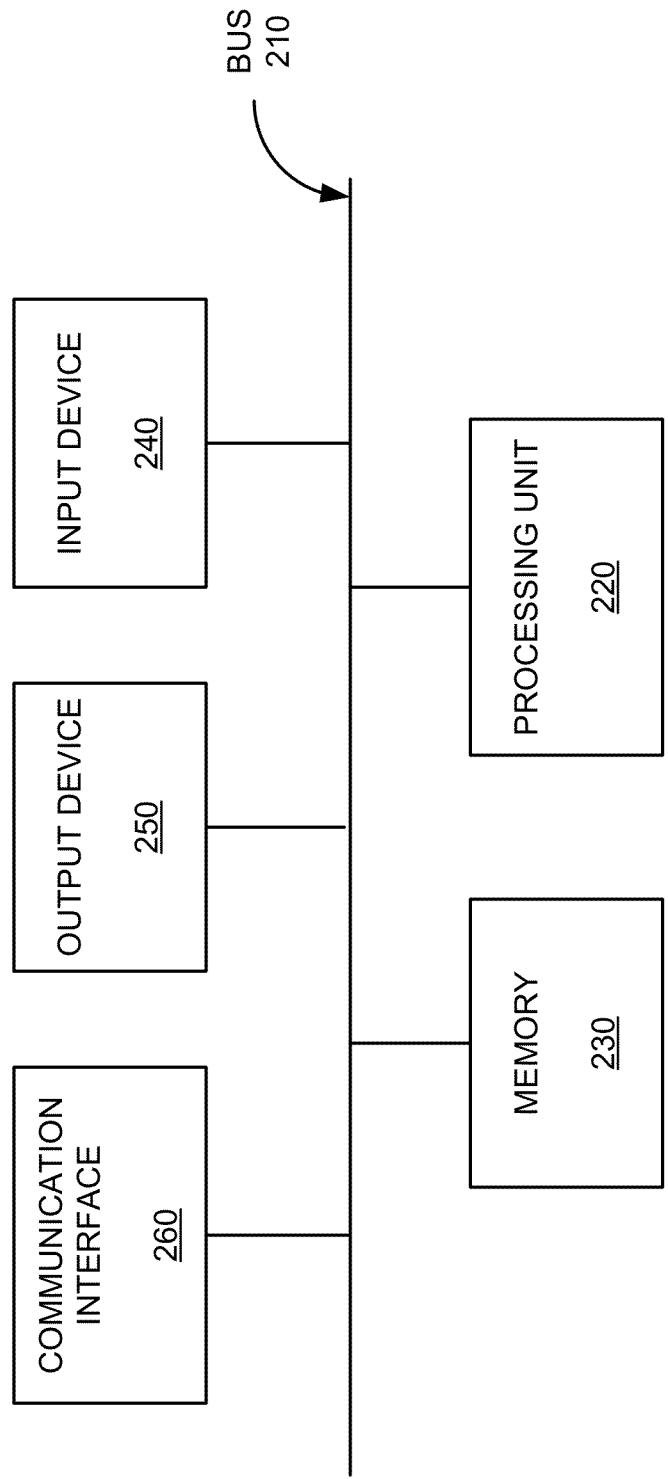
FIG. 2 is a block diagram of exemplary components of a device that may correspond to one of the devices of FIG. 1.

FIG. 2 is a diagram of exemplary components of a device 200 that may correspond to VCMS 110, content delivery server 112, DRM server 114, data center 120, catalog server 122, application server 124, profile server 130, billing server 140, physical content distribution system 150, customer support system 160, or user device 170. Each of VCMS 110, content delivery server 112, DRM server 114, data center 120, catalog server 122, application server 124, profile server 130, billing server 140, physical content distribution system 150, customer support system 160, or user device 170 may include one or more devices 200. As shown in FIG. 2, device 200 may include a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as or include one or more application specific integrated circuits (ASICs), field programmable gate arrays (FPGAs), or the like.

Memory 230 may include a random access memory (RAM) or another type of dynamic storage device that stores information and instructions for execution by processing unit 220, a read only memory (ROM) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of network 100.

As described herein, device 200 may perform certain operations in response to processing unit 220 executing machine-readable instructions contained in a computer-readable medium, such as memory 260. A computer-readable medium may include a non-transitory memory device. A memory device may include space within a single physical memory device or spread across multiple physical memory devices. The machine-readable instructions may be read into memory 260 from another computer-readable medium or from another device via communication interface 250. The machine-readable instructions contained in memory 260 may cause processing unit 220 to perform processes described herein. Alternatively, hardwired circuitry may be used in place of or in combination with machine-readable instructions to implement processes described herein. Thus, implementations described herein are not limited to any specific combination of hardware circuitry and machine-readable instructions.

Although FIG. 2 shows exemplary components of device 200, in other implementations, device 200 may include fewer components, different components, differently arranged components, or additional components than depicted in FIG. 2. As an example, in some implementations, input device 240 and/or output device 250 may not be implemented by device 200. In these situations, device 200 may be a "headless" device that does not explicitly include an input or an output device. Alternatively, or additionally, one or more components of device 200 may perform one or more other tasks described as being performed by one or more other components of device 200.

Figure 3:
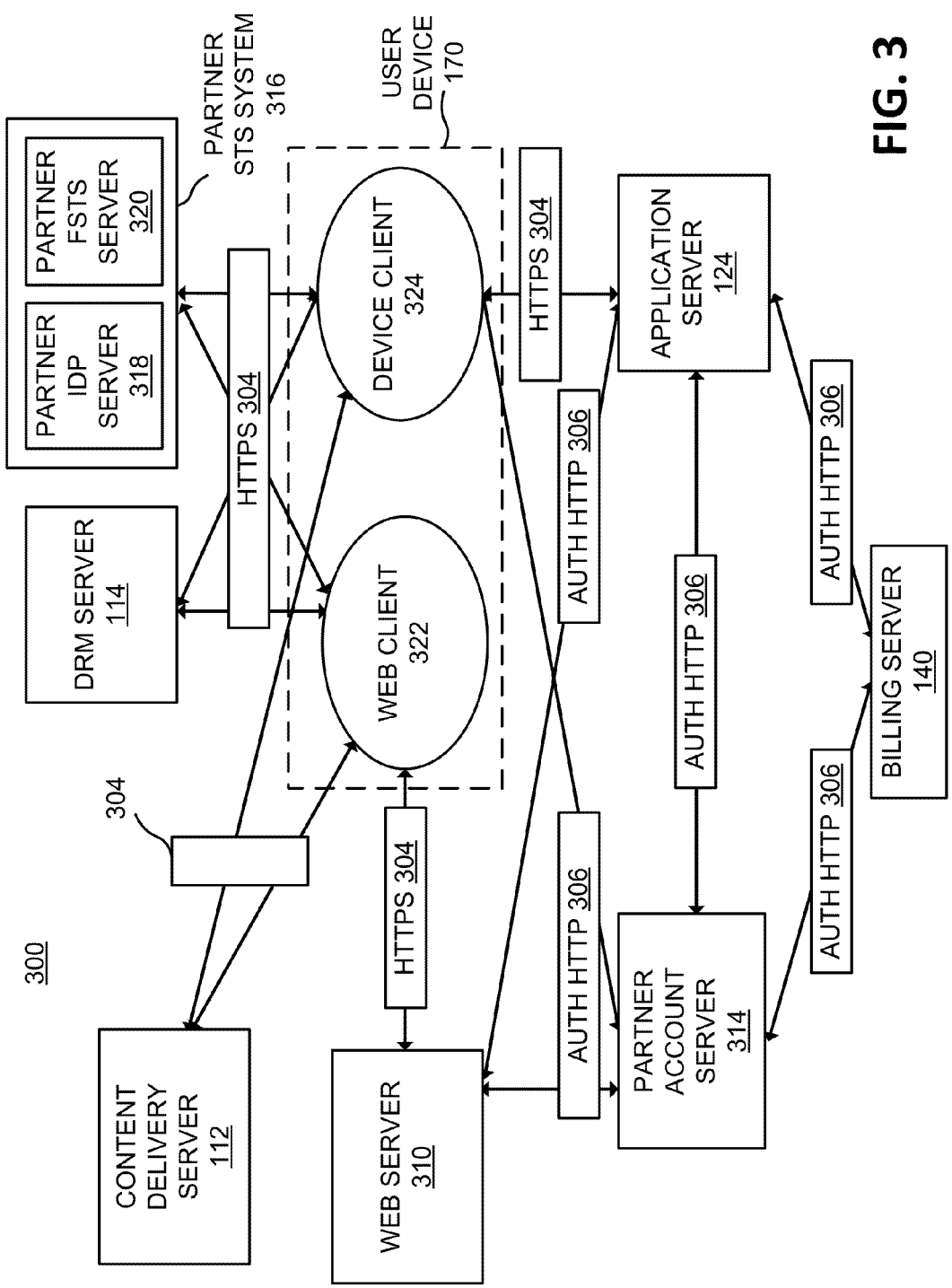
FIG. 3 is a block diagram of an online video platform including security protocols for a user device.

FIG. 3 is a block diagram of an online video platform 300 including security protocols. Online video platform 300 may include components of different networks that interface to provide video services and associated billing for a video service provider entity and a partner entity. As shown in FIG. 3, diagram 300 may include content delivery server 112, DRM server 114, billing server 140, a web server 310, application server 124, a partner account server 314, a partner security token service (STS) system 316, and user device 170. Although only a single partner STS system 316 is shown, architecture 300 may include multiple partner STS systems 316 (e.g., each partner STS system 316 may be associated with federated customer accounts for different partner entities that map into video service provider system 102).

Communication between components of online video platform 300 (i.e., content delivery server 112, DRM server 114, billing server 140, web server 310, application server 124, partner account server 314, partner STS system 316, and/or user device 170) may be implemented to provide client authentication and secure delivery of credit card information, such as described below with respect to FIG. 6 and signal flow diagram 600. Communication in online video platform 300 may be implemented using different security protocols, such as HTTPS 304, or auth HTTP 306, based on particular information (e.g., credit card information, a video session, customer information, etc.) that is transmitted between the components. Auth HTTP 306 may include authentication information associated with components of online video platform 300 (e.g., communication between partner account server 314 and billing server 140 may be implemented using auth HTTP 306).

User device 170 may include machine readable instructions, such as a web client 322 and a device client 324, which enable user device 170 to securely receive/transmit information to content delivery server 112, DRM server 114, web server 310, application server 124, partner account server 314, and/or partner STS system 316.

Web client 322 may enable user device 170 to connect to content delivery server 112, DRM server 114, web server 310, and/or partner STS system 316 via the Internet (or other similar networks) using HTTP 304.

Device client 324 may be a consumer electronics client or a mobile client (based on a particular device type of user device 170). Device client 324 may enable user device 170 to communicate with, for example, video service provider system 102 and/or present information received from video service provider system 102 to a user. Device client 324 may connect to content delivery server 112, DRM server 114, application server 124, partner account server 314, and/or partner STS system 316 to permit a user of user device 170 to log into an account (e.g., via application server 124) or present authentication of an identity, access catalog information (e.g., from catalog server 122), submit an order, and/or consume live streaming video content (e.g., from VCMS 110).

Web server 310 may provide access to components of online platform 300 to web client 322 via an Internet based interface. For example, web server 310 may communicate with application server 124.

Application server 124 may manage customer service information associated with the service provider entity, such as authorized devices, entitlement rights of digital contents, view preferences, and history of digital asset viewing and purchase. The customer service information may be accessed as an extension of partner customer accounts, i.e., the partner customer accounts may be viewed, effectively, as federated accounts in a federated database system. Application server 124 may interface with components of online video platform 300 that are external to video service provider system 102 (e.g., partner account server 314, billing server 140, device client 324, etc.) via an orchestration layer associated with video service provider system 102 (not shown). The orchestration layer is the external interface of the video service provider system 102. The orchestration layer may include orchestration devices (not shown) that may receive requests associated with particular components (e.g., application server 124) of video service provider system 102 and direct responses from the components to addressed external entities (e.g., partner STS system 316).

The partner entity may provide video services (from video service provider system 102) to customers on a reseller basis. Customers may interact with a partner entity to subscribe to video services (e.g., the service provider entity may provide video services that are branded (or co-branded) by the partner entity). Partner account server 314 may provide access to partner customer accounts. Partner customer accounts may include customer account information, such as contact names, email, addresses, billing, and subscription packages maintained by the partner entity.

Partner STS system 316 may provide authentication services associated with the partner entity. Partner STS system 316 may include partner identity provider (IDP) server 318 and partner federated STS (FSTS) server 320.

Partner IDP server 318 may be an identity provider device that issues and validates identities associated with the partner entity. For example, partner IDP server 318 may validate login credentials associated with the partner entity and encrypt a response for partner FSTS server 320.

Partner FSTS server 320 may include, or may provide access to, partner customer accounts via partner account server 314 by issuing tokens in a federated database system.

Billing server 140 may provide billing services associated with (or administered by) the partner entity. Billing server 140 may receive credit card information transferred from user device 170 via applications associated with (implemented by) video service provider system 102 and the service provider entity. The credit card information may be secured from entry at user device 170 to receipt at billing server 140.

Figure 4:
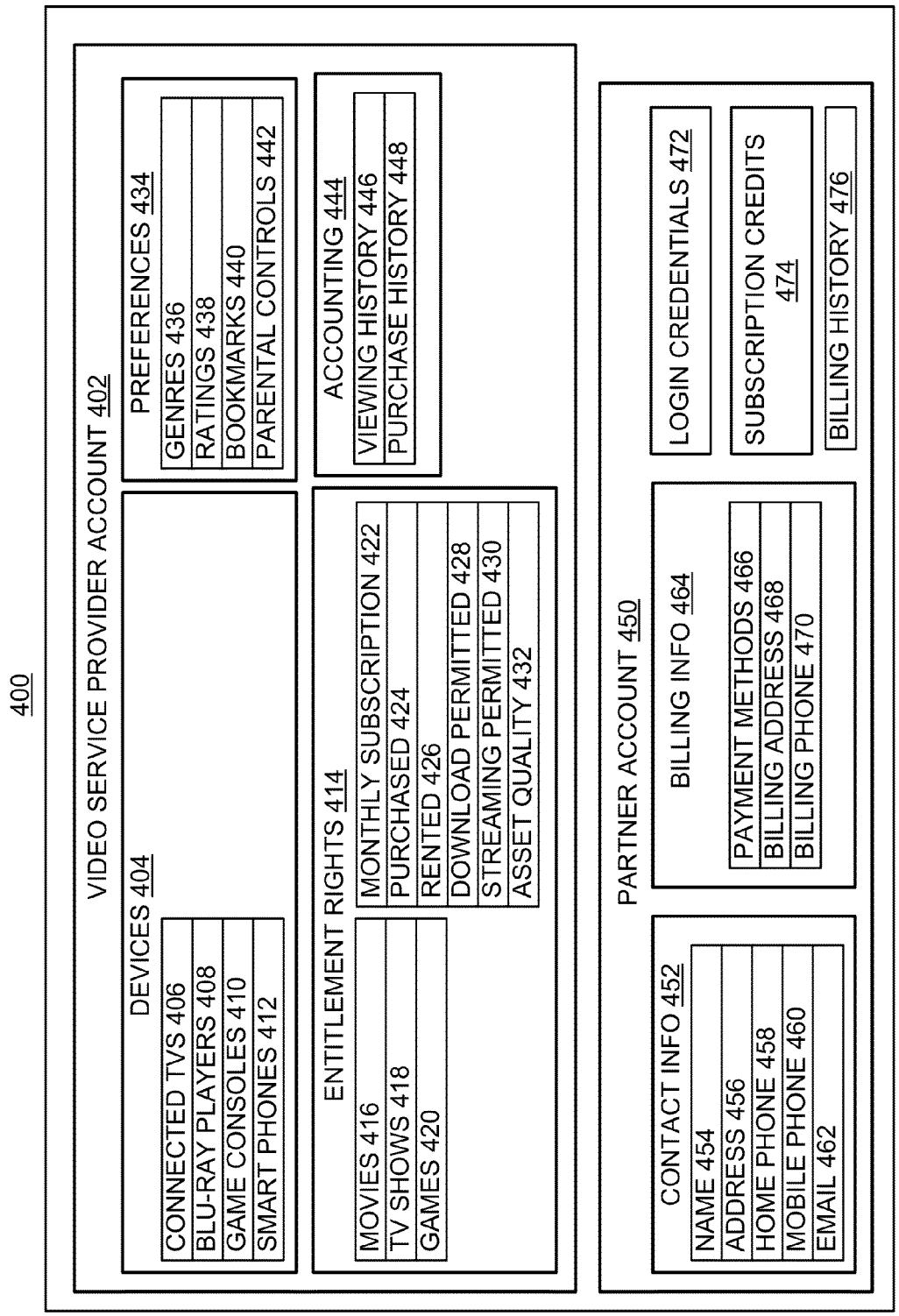
FIG. 4 is a diagram of an exemplary federated account.

FIG. 4 is a diagram of an exemplary federated customer account table 400. As shown in FIG. 4, federated customer account table 400 may include a video service provider account 402, and a partner account 450. Federated customer account table 400 may include information based on a particular customer (i.e., table 400 illustrates a federated account for a single customer) and may be stored in partner account server 314 or another device associated with partner account server 314.

Video service provider account 402 may store information associated with video service provider system 102. Video service provider account 402 may include entries based on video services provided by video service provider system 102 to user device 170 including information indicating devices 404, entitlement rights 414, preferences 434, and accounting 444 associated with the particular customer.

Devices 404 may include a listing of connected televisions (TVs) 406, Blu-ray players 408, game consoles 410 (e.g., Xbox™, Wii™, PlayStation™, etc.), and smart phones 412 (e.g., iOS™, Android™, etc.).

Entitlement rights 414 may indicate video content available to (including terms of access to the video content) for the particular customer. Video content may include movies 416, TV shows 418, and games 420. Entitlement rights 414 may indicate that the particular customer has access for video content based on a monthly subscription 422, purchased 424, or rented 426. Entitlement rights 414 may also indicate whether video content is download permitted 428 and/or streaming permitted 430 (e.g., either on an item-by-item or for all video content associated with video service provider account 402) and an asset quality 432 of video content items (e.g., whether the video content item is high definition (HD), standard definition (SD), etc.).

Preferences 434 may indicate settings associated with the video content for the particular customer, such as genres 436 (e.g., horror, action, comedy, etc.), ratings 438 (e.g., parental guidance 13 (PG13), restricted (R), etc.), bookmarks 440 (for particular video content), parental controls 442 (e.g., password protection for content rated R), etc.

Accounting 444 may include information that may be used to determine charges applicable to the particular customer for video services received from video service provider system 102. Accounting 444 may include a viewing history 446 and a purchase/rental history 448 for the video content items.

Partner account 450 is associated with a partner entity. The partner entity may offer video services provided by video service provider system 102 and may interface directly with the customer. Partner account 450 may include information associated with the customer including contact information (info) 452, billing info 464, login credentials 472, subscription credits 474, and billing history 476.

Contact info 452 may include a name 454, an address 456 (i.e., mailing address or residential address), home phone 458 (i.e., a home phone number), mobile phone 460 (i.e., a mobile phone number), and an email 462 associated with the particular customer. Partner entity may receive contact info 452 at initial sign up for the video service in association with the partner entity.

Billing info 464 may include payment methods 466 (e.g., credit cards, checking accounts, PayPal™, etc.), a billing address 468, and a billing phone 470, which may be used to process billing for video services by the partner entity.

Login credentials 472 may include login information for the particular customer that provides access to the video services. For example, login credentials may include a login name and password.

Subscription credits 474 may provide access to physical content, such as DVDs or Blu-ray discs that are offered by the partner entity.

Figure 5:
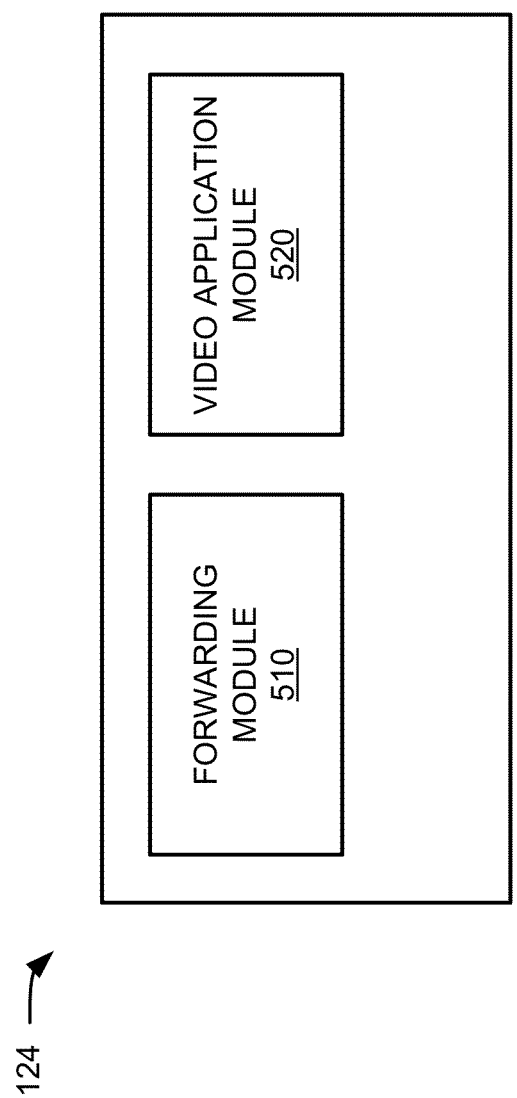
FIG. 5 is a diagram of exemplary functional components of the application server of FIG. 1.

FIG. 5 is a diagram of exemplary functional components of application server 124. In one implementation, the functions described in connection with FIG. 5 may be performed by one or more components of device 200 (FIG. 2). As shown in FIG. 5, application server 124 may include a forwarding module 510, and a video application module 520.

Forwarding module 510 may receive SAML tokens from external devices, such as device client 324 of user device 170 and may forward the SAML tokens to other components of online platform 300, such as partner FSTS server 320. Forwarding module 510 may forward the SAML token based on information included in a message provided by the sending device (e.g., partner FSTS server 320, device client 324, etc.).

Video application module 520 may permit user device 170 to download an application that enables a user to find content of interest or play downloaded or streaming content. Video application module 520 may support video services for authenticated customers of video service provider system 102.

Figure 6:
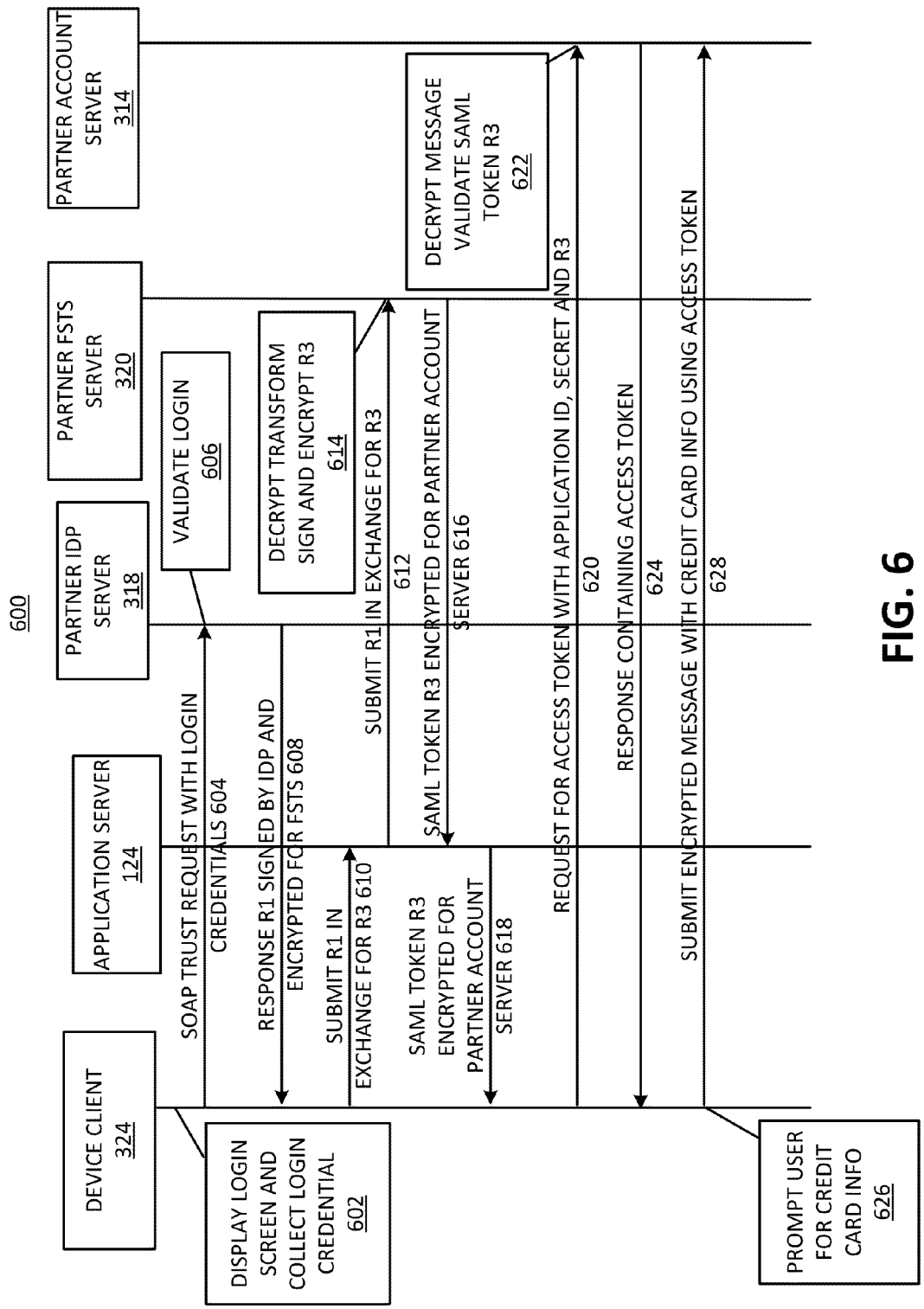
FIG. 6 is a signal flow diagram of exemplary messages implementing client authentication and secure delivery of credit card information in the online video platform.
Figure 7:
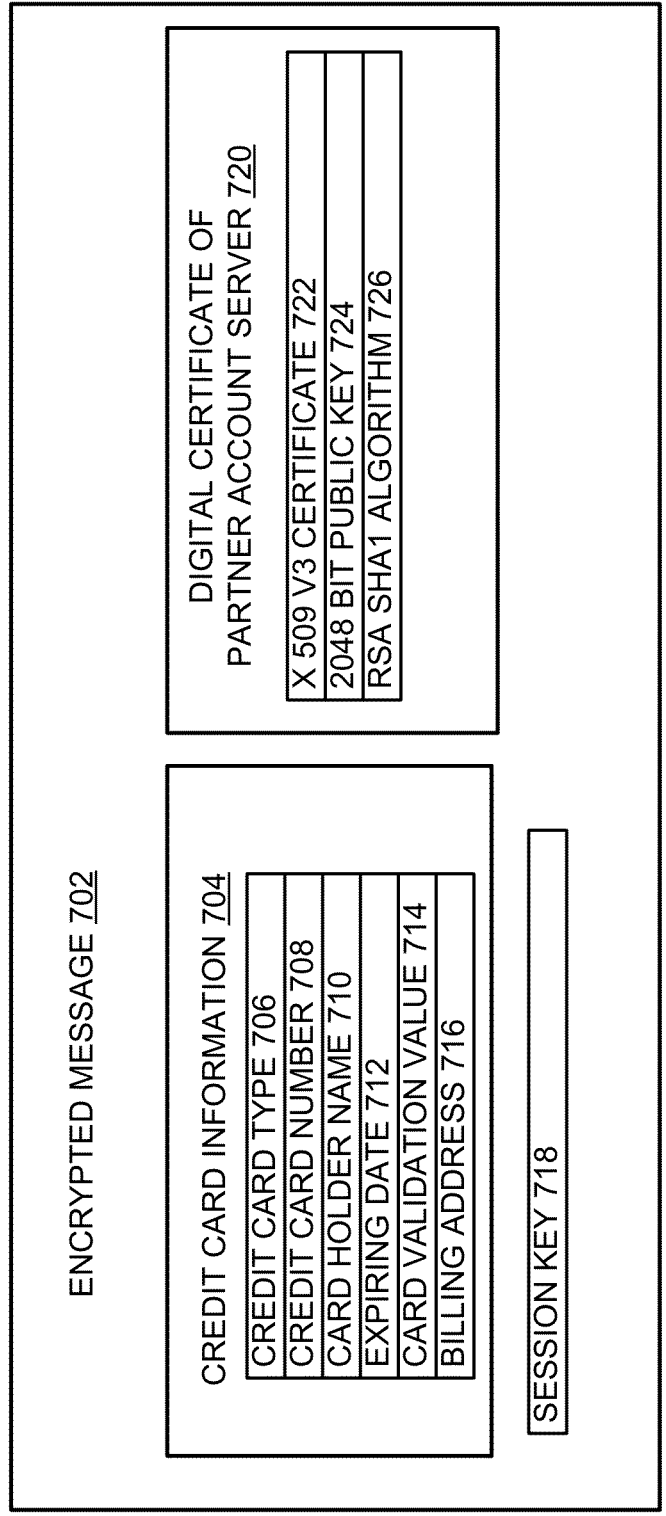
FIG. 7 is a diagram of an exemplary encrypted credit card information table.

FIG. 6 is a signal flow diagram 600 of exemplary messages implementing client authentication and secure delivery of credit card information in the online video platform. Signal flow diagram 600 may include device client 324, application server 124, partner IDP server 318 and partner FSTS server 320, and partner account server 314. The particular arrangement and number of components in signal flow diagram 600 as shown in FIG. 6 is illustrated for simplicity. Signal flow diagram 600 is described with reference to credit card information table 700, which is shown in FIG. 7.

With reference now to FIG. 6, device client 324 (of user device 170) may not currently have a valid Simple Object Access Protocol (SOAP) response token (R1). SOAP is an Extensible Markup Language (XML) based protocol that specifies a format for exchanging structured information in the implementation of web services in computer networks. Device client 324 may display a login screen and collect service provider login credential (process 602). For example, device client 324 may generate a graphical user interface (GUI) for the user to enter service provider login credentials. The login screen may accept alphanumeric characters. The user may have previously signed up for a (service provider) user account or may sign up for the user account using web client 322.

Device client 324 may send a request for an authentication token with (service provider) login credential as an input to partner IDP server 318 (604).

Partner IDP server 318 may validate the login credentials (606). Partner IDP server 318 may send a SAML response token R1 to device client 324 with SAML assertion signed by partner IDP server 318 and encrypted for partner FSTS server 320 (608). The authenticity and integrity of the SAML token is maintained by a digital signature of partner IDP server 318. The SAML token may have a predetermined lifetime (e.g., the SAML token may only be valid for a predetermined number of hours). In instances in which device client 324 has a valid token R1, device client 324 may skip signal flows 604 and 606 and proceed to 608.

Device client 324 may submit response token R1 as input to application server 124 in exchange for a SAML token R3 that is encrypted for partner account server 314 (610). Application server 124 may forward response token R1 as input to partner FSTS server 320 in exchange for a SAML token R3 issued to partner account server 314 (612).

Partner FSTS server 320 may decrypt the SAML token in response token R1, validate the SAML token, transform the SAML token, sign and encrypt the SAML token for partner account server 314 (614). Partner FSTS server 320 may send a SAML response token R3 to application server 124 (616). Application server 124 may send the SAML token R3 to device client 324 (618).

Device client 324 may send a request for an access token with an application ID, open standard for authorization (OAuth) secret and SAML token R3 to partner account server 314 (620). OAuth is a protocol that allows access via an application programming interface (API) (often associated with an end user) to protected resources from a web service based on the OAuth secret and an access token. The application ID and secret may be issued out of band by partner account server 314. Partner account server 314 may receive the application ID, secret and SAML token R3 and decrypt the message. Partner account server 314 may validate SAML token R3 to determine whether an access token is to be provided to device client 324 (622). For example, partner account server 314 may decrypt the assertion inside the response with the corresponding private key of partner account server 314. Partner account server 314 may provide a response to device client 324 that includes the access token.

Device client 324 may encrypt credit card information received from the user (624). For example, device client 324 may prompt the user to enter the credit card information into a corresponding GUI 626. The credit card message may be encrypted as described below with respect to FIG. 7. Device client 324 may submit the encrypted credit card information with the access token to partner account server 314 (628).

FIG. 7 illustrates exemplary information contained in an encrypted message table 700. Encrypted message table 700 may include information that may be transmitted in an encrypted message 702. Encrypted message 702 may include credit card information 704, a session key 718, and a digital certificate 720 of partner credit card database server (not shown), a component of partner account server 314.

Credit card information 704 may include a credit card type 706 (e.g., VISA™, MasterCard™, etc.), a credit card number 708 (i.e., a sixteen digit number), a cardholder name 710, an expiring date 712 (of the credit card), a card validation value 714 (i.e., a three digit number that may be used to validate the credit card), and a billing address 716.

Session key 718 may be a random advanced encryption standard (AES) 128-bit session key. Session key 718 may be encrypted by the public key of partner credit card database server, a component of partner account server 312.

Digital certificate 720 may be an X.509 (public key infrastructure and privilege management infrastructure) v3 certificate 722. Digital certificate 720 may be a 2048 bit public key 724 that is encrypted based on an RSA (Rivest, Shamir Adelmen) secure hash algorithm version 1 (SHA1) 726.

FIG. 8 is a flow chart of an exemplary process for implementing client authentication and secure delivery of credit card information in the online video platform according to implementations described herein. In one implementation, process 800 may be performed by application server 124. In another implementation, some or all of process 800 may be performed by another device or group of devices, including or excluding application server 124.

As shown in FIG. 8, application server 124 may receive a SAML token response token R1 from a device client 324 (block 802). The SAML token R1 may be signed by IDP server 318 and encrypted. Device client 324 may send R1 to application server 124 in exchange for SAML token R3, which is issued to partner account server 314.

Application server 124 may submit SAML token R1 to partner FSTS server 320 (block 804). Partner FSTS server 320 may decrypt and validate R1. Partner FSTS server 320 may transform R1 into R3 and encrypt R3 for partner account server 314.

Application server 124 may receive SAML token R3 encrypted for partner account server 314 from partner FSTS server 320 (block 806).

Application server 124 may send the SAML token R3 to device client 324 (block 808). Device client 324 may receive SAML token R3. Device client 324 may send credit card information to partner account server 314 based on SAML token R3. The encrypted credit card information may include an application identifier and a client secret based on an open authorization protocol. The client secret may be received out of band and associated with the user of user device 170.

Figure 9:
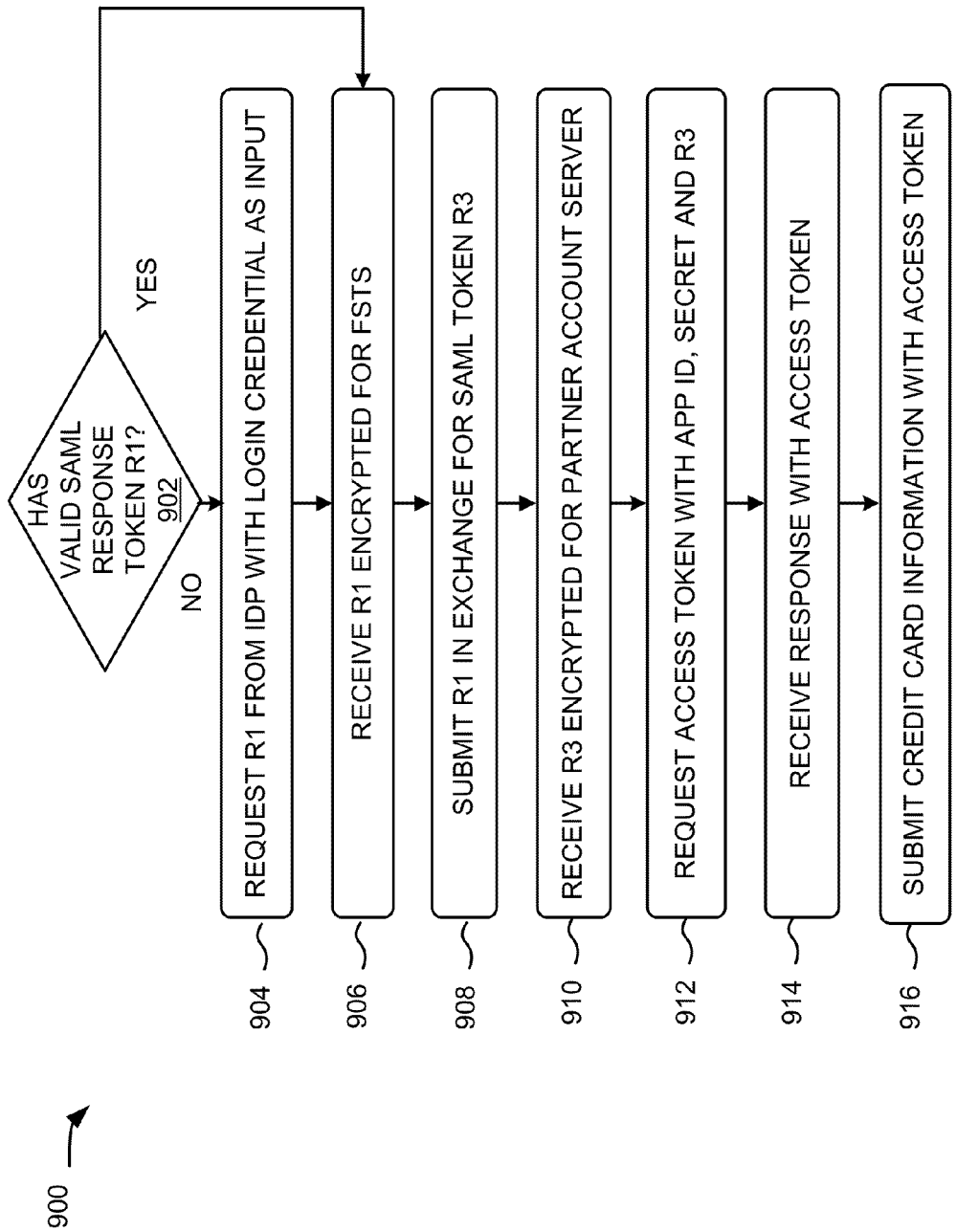
FIG. 9 is a flow chart of an exemplary process for client authentication and secure delivery of credit card information in the online video platform according to an implementation described herein.

FIG. 9 is a flow chart of an exemplary process for implementing client authentication and secure delivery of credit card information in the online video platform according to implementations described herein. In one implementation, process 900 may be performed by user device 170. In another implementation, some or all of process 900 may be performed by another device or group of devices, including or excluding user device 170.

As shown in FIG. 9, user device 170 (i.e., device client 324) may identify that user device 170 is not in possession of a valid SAML response token R1 (i.e., an authentication token associated with partner FSTS server 320) (block 902).

User device 170 may request R1 from partner IDP server 318 if user device 170 does not have a valid R1 (block 904). The request may include login credentials that are input to a GUI of user device 170 by a user. User device 170 may receive R1 from partner IDP server 318 (block 906).

User device 170 may submit R1 in exchange for SAML token R3 (block 908). User device 170 may have received R1 from partner IDP server 318 (block 906) or may have previously stored R1 (block 902, yes). User device 170 may receive SAML token R3 encrypted for partner account server 314 (block 910).

User device 170 may send a request for an access token to partner account server 314 (block 912). The request may include an application ID and an OAuth secret. User device 170 may receive the access token from partner account server 314 (block 914).

User device 170 may submit encrypted credit card information (e.g., as shown in FIG. 7) to partner account server 314 (block 916).

Systems and/or methods described herein may allow client authentication and secure delivery of credit card information in an online video platform. The credit card information is protected by encrypting with the public key of a partner credit card database server. The encrypted information may only be decrypted by the partner credit card database server.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIGS. 8 and 9, the order of the blocks may be modified in other implementations. Further, non-dependent blocks may be performed in parallel.

It will be apparent that different aspects of the description provided above may be implemented in many different forms of machine-readable instructions, firmware, and hardware in the implementations illustrated in the figures. The actual machine-readable instructions or specialized control hardware used to implement these aspects is not limiting of the invention. Thus, the operation and behavior of these aspects were described without reference to the specific machine-readable instructions—it being understood that machine-readable instructions and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and machine-readable instructions.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A computer-implemented method comprising:
receiving, at a video service provider system that provides digital video content in association with a partner entity system that includes a partner federated security token service (FSTS) device and a partner identity provider (IDP) device, a security markup assertion language (SAML) token encrypted for the partner FSTS device from a client device associated with a customer account for digital video content, wherein the SAML token is signed by the partner IDP device, and the SAML token was issued to the client device in response to a request for the SAML token with login credentials sent from the client device to the partner IDP device upon the SAML token being issued to the client device;
submitting the SAML token to the partner FSTS device in exchange for a partner SAML token, wherein the partner SAML token is encrypted for a partner account device;
receiving, by the video service provider system, the partner SAML token from the partner FSTS device; and
upon receiving the partner SAML token from the partner FSTS device, sending the partner SAML token to the client device, wherein the client device is configured to request an access token from the partner account device based on the partner SAML token and to submit an encrypted message including credit card information to the partner account device based on the access token to support billing of the customer account in association with at least one digital video content item received at the client device from the video service provider system.

2. The computer-implemented method of claim 1, wherein the encrypted message includes an application identifier (ID) and a client secret based on an open authorization protocol.

3. The computer-implemented method of claim 2, wherein the application ID and the client secret are assigned out of band.

4. The computer-implemented method of claim 1, wherein the credit card information includes a credit card type, a credit card number, a cardholder name, an expiring date, a card validation value and a billing address.

5. The computer-implemented method of claim 1, wherein the encrypted message includes a digital certificate of the partner account device that is encrypted with a 2048 bit public key.

6. The computer-implemented method of claim 1, wherein the SAML token has a predetermined lifetime.

7. The computer-implemented method of claim 1, wherein the SAML token is a SAML 2.0 token.

8. A computer-implemented method comprising:
sending, from a client device to a video service provider system that provides digital video content in association with a partner entity system that includes a partner federated security token service (FSTS) device and a partner identity provider (IDP) device, a request for a security markup assertion language (SAML) token encrypted for a partner federated security token service (FSTS) device that includes login credentials; in response to the video service provider system sending the request for the SAML token to the partner FSTS device, receiving the SAML token and sending the SAML token, receiving the SAML token signed by the partner IDP device;
submitting the SAML token to the partner FSTS device in exchange for a partner SAML token encrypted for a partner account device;
receiving the partner SAML token encrypted for the partner account device;
sending, by the client device, a request message for an access token with an application identifier (ID), a client secret and the partner SAML token;
receiving the access token by the client device; and
submitting, by the client device, an encrypted message including encrypted credit card information with the access token to the partner account device, wherein the client device is to receive digital video content items from the video service provider system and billing for the digital video content items is to be based on decrypted credit card information.

9. The computer-implemented method of claim 8, wherein submitting the SAML token to the partner FSTS device further comprises:
sending the SAML token to an orchestration device associated with a service provider entity, wherein the orchestration device is configured to forward the SAML token to the partner FSTS device.

10. The computer-implemented method of claim 8, wherein an authenticity and integrity of the SAML token is maintained by a digital signature of the partner IDP device.

11. The computer-implemented method of claim 8, wherein sending the request for the SAML token encrypted for the partner FSTS device further comprises:
determining whether the client device has the SAML token; and
sending the request for the SAML token in response to a determination that the client device does not have the SAML token.

12. The computer-implemented method of claim 8, further comprising:
providing a login screen on a graphical user interface of the client device, wherein the login screen accepts alphanumeric input; and
receiving login credentials input by a user.

13. The computer-implemented method of claim 8, wherein the partner FSTS device is configured to decrypt the SAML token, to transform the SAML token into the partner SAML token, and to encrypt the partner SAML token for the partner account device.

14. The computer-implemented method of claim 8, wherein the partner account device is configured to decrypt the request message, to validate the partner SAML token and to return the access token if the partner SAML token is successfully validated.

15. The computer-implemented method of claim 8, wherein the encrypted message includes a digital certificate of the partner account device that is encrypted with a Rivest, Shamir Adelmen (RSA) secure hash algorithm version 1 (SHA1) and a 2048 bit public key.

16. The computer-implemented method of claim 15, wherein the digital certificate is used for cookie encryption only.

17. A video service provider device, comprising: a memory to store a plurality of instructions; and a processor configured to execute instructions in the memory to receive, at a video service provider system that provides digital video content in association with a partner entity system that includes a partner federated security token service (FSTS) device and a partner identity provider (IDP) device services, a security markup assertion language (SAML) token encrypted for the partner FSTS device from a client device associated with a customer account for digital video content, wherein the SAML token is signed by the IDP device, and the SAML token was issued to the client device in response to a request for the SAML token with login credentials sent from the client device to the partner IDP device upon the SAML token being issued to the client device;
submit the SAML token to the partner FSTS device in exchange for a partner SAML token, wherein the partner SAML token is encrypted for a partner account device;
receive, by the video service provider system, the partner SAML token from the partner FSTS device; and
upon receiving the partner SAML token from the partner FSTS device, send the partner SAML token to the client device, wherein the client device is configured to request an access token from the partner account device based on the partner SAML token and to submit an encrypted message including credit card information to the partner account device based on the access token to support billing of the customer account in association with at least one digital video content item received at the client device from the video service provider system.

18. The video service provider device of claim 17, wherein the processor is further configured to:
submit and receive hypertext transfer protocol (HTTP) transport over or more of secure sockets layer (SSL) or transport layer security (TLS).

19. A system, comprising:
a video service provider system that provides an online video service and is associated with a service provider entity;
a partner identity provider (IDP) device that validates login credentials associated with a partner entity of the service provider entity;
a partner federated security token service (FSTS) device that provides security tokens associated with the partner entity; and
a partner account device that manages a partner customer account associated with the partner entity; and
wherein the partner IDP device is configured to receive a request for an authentication token from a client device with login credentials as input,
validate the login credentials, and
provide the authentication token signed by the partner IDP device and encrypted for the partner FSTS device to the client device; and
wherein the video service provider system is configured to receive the authentication token encrypted for the partner FSTS device from the client device,
send the authentication token to the partner FSTS device in exchange for a partner SAML token, wherein the partner SAML token is encrypted for the partner account device,
receive the partner SAML token, and
send the partner SAML token to the client device; and
wherein the partner account device is configured to receive a request for an access token from the client device based on the partner SAML token,
send the access token to the client device, and
receive an encrypted message including credit card information from the client device based on the access token.

20. The system of claim 19, wherein the partner FSTS device is configured to decrypt the SAML token, to transform the SAML token into the partner SAML token, and to encrypt the partner SAML token for the partner account device.

* * * * *